United States Patent [19]

Ellul

[11] Patent Number: 5,290,886
[45] Date of Patent: Mar. 1, 1994

[54] THERMOPLASTIC ELASTOMERS HAVING IMPROVED LOW TEMPERATURE PROPERTIES

[75] Inventor: Maria D. Ellul, Silver Lake Village, Ohio

[73] Assignee: Advanced Elastomer Systems, L.P., St. Louis, Mo.

[21] Appl. No.: 49,896

[22] Filed: Apr. 20, 1993

[51] Int. Cl.$^5$ ............... C08L 23/12; C08L 23/16
[52] U.S. Cl. .................. 524/515; 524/518; 524/525; 525/211; 525/232
[58] Field of Search .............. 524/515, 518, 525; 525/211, 232

[56] References Cited

U.S. PATENT DOCUMENTS

| | | | |
|---|---|---|---|
| Re. 32,028 | 4/1974 | Fischer | 525/194 |
| 3,037,954 | 6/1962 | Gessler et al. | 260/29.8 |
| 3,825,515 | 7/1974 | Lucas et al. | 260/31.8 M |
| 4,130,534 | 12/1978 | Coran et al. | 260/33.6 AQ |
| 4,130,535 | 12/1978 | Coran et al. | 260/33.6 AQ |
| 4,472,537 | 9/1984 | Johnson et al. | 524/272 |
| 4,999,406 | 3/1991 | Sharaby | 525/386 |
| 5,057,566 | 10/1991 | Kobayashi et al. | 524/297 |
| 5,100,947 | 3/1992 | Puydak et al. | 524/423 |
| 5,157,081 | 10/1992 | Puydak et al. | 525/237 |
| 5,162,445 | 11/1992 | Powers et al. | 525/333.4 |
| 5,169,716 | 12/1992 | Croft et al. | 523/173 |

FOREIGN PATENT DOCUMENTS 0337976 10/1989 European Pat. Off. .
1103681 2/1968 United Kingdom .

*Primary Examiner*—Vasu S. Jagannathan
*Attorney, Agent, or Firm*—William A. Skinner

[57] ABSTRACT

Thermoplastic elastomers having improved low temperature properties are provided by incorporating suitable low molecular weight ester plasticizer into blends of crystalline polyolefin homopolymer or copolymer and olefinic rubber. The rubber component of the composition is at least partially cured.

15 Claims, No Drawings

THERMOPLASTIC ELASTOMERS HAVING IMPROVED LOW TEMPERATURE PROPERTIES

BACKGROUND OF THE INVENTION

1. Field of the Invention

This invention relates to thermoplastic elastomers having improved low temperature performance characteristics. A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic polyolefin with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisobutene in an uncured matrix of thermoplastic polymer such as polypropylene. This patent describes the use of oil additives derived from coal tar, pine tar or petroleum in the composition.

In U.S. Pat. No. Re. 32,028 polymer blends comprising an olefin thermoplastic resin and an olefin copolymer rubber are described, wherein the rubber is dynamically vulcanized to a state of partial cure. The resulting compositions are reprocessible. The addition of various lubricants to the cured blend at about one phr is taught to be useful for improving extrusion quality of the compositions.

U.S. Pat. Nos. 4,130,534 and 4,130,535 disclose thermoplastic elastomer compositions comprising butyl rubber and polyolefin resin, and olefin rubber and polyolefin resin, respectively. The compositions are prepared by dynamic vulcanization and the rubber component is cured to the extent that it is essentially insoluble in conventional solvents. The addition of plasticizers and aromatic, naphthenic and paraffinic extender oils to the blend is suggested. No details are given regarding the choice or suitability of any particular class or type of plasticizers. It is well known that different rubbers are compatible with certain types of plasticizers and that not all plasticizers are suitable with all rubbers.

In U.S. Pat. No. 5,157,081 a dynamically vulcanized blend is described comprising a first butyl rubber based elastomer and a second ethylene-propylene polymer elastomer in a matrix of polyolefinic resin. Rubber process oils derived from petroleum fractions may be included, and a general suggestion is made that organic esters and other synthetic plasticizers can be used.

SUMMARY OF THE INVENTION

The present invention is based on the discovery that a thermoplastic elastomer composition having improved low temperature properties is provided by incorporating certain types of low molecular weight ester plasticizers into a blend of crystalline polyolefin homopolymer or copolymer and olefinic rubber. The rubber component of the composition is usually present as very small, i.e. micro-size, particles in the thermoplastic matrix, and it is preferably at least partially cured. Co-continuous morphologies are also possible. Unexpectedly, the inclusion of these organic esters in the composition provides a thermoplastic elastomer which has a significantly lowered glass transition temperature of both the rubber and polyolefin phases and improved impact strength at low temperatures, while maintaining the desirable properties of low compression set, high tear strength and good dynamic properties over a broad temperature range. The compositions have utility as constant velocity joint boots, rack and pinion boots, automotive elastoplastic components and mechanical rubber-plastic (thermoplastic elastomer) goods which need to be serviceable at low temperatures, e.g. −40° C.

DESCRIPTION OF THE PREFERRED EMBODIMENTS

Polyolefin

Polyolefins suitable for use in the compositions of the invention include thermoplastic, crystalline polyolefin homopolymers and copolymers. They are desirably prepared from monoolefin monomers having 3 to 6 carbon atoms, such as propylene, 1-butene, isobutylene, 1-pentene and the like, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 16 carbon atoms, and mixtures thereof. The polypropylene can be highly crystalline isotactic or syndiotactic polypropylene, usually having a narrow range of glass transition temperature ($T_g$). Commercially available polyolefins may be used in the practice of the invention.

The amount of polyolefin found to provide useful compositions is generally from about 10 to about 90 weight percent, based on the weight of the rubber and polyolefin. Preferably, the polyolefin content will range from about 60 to about 90 percent by weight.

Olefinic Rubber

Suitable monoolefin copolymer rubbers comprise non-polar, essentially non-crystalline, rubbery copolymers of two or more α-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and the like.

Butyl rubbers are also useful in the compositions of the invention. As used in the specification and claims, the term "butyl rubber" includes copolymers of an isoolefin and a conjugated monoolefin, terpolymers of an isoolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180, which is fully incorporated herein by this reference.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to about 10 wt %. A preferred example is the brominated copolymer of isobutylene and para-methylstyrene. These copolymers are more fully described in U.S. Pat. No. 5,162,445, which is fully incorporated herein by this reference.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used.

Blends of any of the above olefinic rubbers can be employed, rather than a single olefinic rubber.

In preparing the compositions of the invention, the amount of olefinic rubber generally ranges from about 90 to about 10 weight percent, based on the weight of the rubber and polyolefin. Preferably, the olefinic rubber content will be in the range of from about 40 to about 10 weight percent.

Ester Plasticizer

The addition of certain low to medium molecular weight (<10,000) organic esters and alkyl ether esters to the compositions of the invention dramatically lowers the $T_g$ of the polyolefin and rubber components, and of the overall composition, and improves the low temperature properties, particularly flexibility and strength. It is believed that these effects are achieved by the partitioning of the ester into both the polyolefin and rubber components of the compositions. Particularly suitable esters include monomeric and oligomeric materials having an average molecular weight below about 2000, and preferably below about 600. It is important that the ester be compatible, or miscible, with both the polyolefin and rubber components of the compositions, i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

Esters may be screened for suitability by a simple test of their ability to swell a polyolefin such as polypropylene. For the purposes of this invention, polypropylene samples (2.0×20×50 mm) were immersed in various ester plasticizers or non-ester diluents such as mineral oils, and were swollen at 125° C. to constant weight (normally about 24 hours). If the total change in weight was greater than 40%, the diluent was considered significantly compatible with the polypropylene and therefore suitable for preparing compositions with enhanced low temperature performance.

Examples of esters which have been found satisfactory for use in the present invention include isooctyltallate, isooctyloleate, n-butyltallate, n-butyloleate, butoxyethyloleate, dioctylsebacate, di 2-ethylhexylsebacate, dioctylazelate, diisooctyldodecanedioate, alkylalkylether diester glutarate and oligomers thereof. Other analogues expected to be useful in the present invention include alkyl alkylether mono- and di-adipates, mono- and dialkyl adipates, glutarates, sebacates, azelates, ester derivatives of castor oil or tall oil and oligomeric mono- and diesters or mono- and dialkyl ether esters therefrom. Isooctyltallate and n-butyltallate are particularly preferred. These esters may be used alone in the compositions, or as mixtures of different esters, or they may be used in combination with conventional hydrocarbon oil diluents or process oils, e.g. paraffin oil. The amount of ester plasticizer in the composition will generally be less than about 250 phr, and preferably less than about 175 phr.

Additives

In addition to the polyolefin, rubber and ester components, the compositions of the invention include curatives and may also include reinforcing and non-reinforcing fillers, antioxidants, stabilizers, rubber processing oil, extender oils, lubricants, antiblocking agents, antistatic agents, waxes, foaming agents, pigments, flame retardants and other processing aids known in the rubber compounding art. Such additives can comprise up to about 50 wt % of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity based on the total rubber content may range from zero to a few hundred phr. However, it is an important aspect of the present invention that processing oil need not be present, and in fact it may be totally replaced by the ester plasticizer component of the composition. In other word, depending upon the properties desired in the thermoplastic elastomers of the invention, the composition may be free of processing oil or it may contain a combination of processing oil and ester.

Processing

The olefin rubber component of the thermoplastic elastomer is generally present as small, i.e. micro-size, particles within a continuous polyolefin matrix, although a co-continuous morphology or a phase inversion is also possible depending on the amount of rubber relative to plastic, and the cure system or degree of cure of the rubber. The rubber is desirably at least partially crosslinked, and preferably is completely or fully crosslinked. The partial or complete crosslinking can be achieved by adding an appropriate rubber curative to the blend of polyolefin and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific olefinic rubber or combination of rubbers being used and with the polyolefin. These curatives include sulfur, sulfur donors, metal oxides, resin systems, peroxide-based systems and the like, both with and without accelerators and co-agents. Such cure systems are well known in the art and literature of vulcanization of elastomers.

The terms "fully vulcanized" and "completely vulcanized" as used in the specification and claims means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081, both of which are fully incorporated herein by this reference.

The following general procedure was used in the preparation of thermoplastic elastomers of the invention as set forth in the examples. The polyolefin and rubber were placed in a heated internal mixer, with an appropriate portion of the ester and other desired additives. The mixture was heated to a temperature sufficient to melt the polyolefin component, the mixture was masticated and curative was added while mastication continued. After a maximum of mixing torque indicated that vulcanization had occured, additional ester was added as indicated, and mixing was continued until the desired degree of vulcanization was achieved. The order of addition of the various components may vary. The compositions were then removed from the mixer, molded and tested for their physical properties.

The invention will be better understood by reference to the following examples which serve to illustrate but not limit the present invention.

EXAMPLE 1

After screening diluents with the swelling test described earlier, compositions were prepared to demonstrate the effect of including certain organic esters in thermoplastic elastomers, as compared to mineral oils. The rubber, plastic, a phenolic curing agent and additives were blended in an electrically heated Brabender mixer of 65-80 cm$^3$ capacity, at a mixing speed of 100 rpm and a temperature of 120° to 190° C. Before melting of the polyolefin component, a Lewis acid was added to the blend and mixing was continued. The mixing temperature as a function of time was observed, and the onset of vulcanization was accompanied by a rapid increase in mixing torque at around 185° C. Mixing was stopped when the torque became relatively constant. The compositions were removed from the mixer and sheets were molded at 190° C. and used for measurement of physical properties.

The key property for determining the efficacy of a plasticizer in improving the low temperature behavior of a thermoplastic elastomer is the glass transition temperature of both the rubber and plastic components. The glass transition temperatures ($T_g$) were measured using a Rheometrics RDA II dynamic mechanical spectrometer, using the torsional mode. The dynamic strain was 0.5%; the autostrain feature was used; the frequency was 10 Hz.

Control blend "A" contained no ester plasticizer, and had the following composition:

| Ingredient | % | PHR |
|---|---|---|
| EPDM (Vistalon 8600) | 25.71 | 100 |
| Isotactic Polypropylene | 56.34 | 219.10 |
| Fillers: | | |
| Active black (40%) | 4.96 | 19.28 |
| Clay | 10.29 | 40.00 |
| Curatives | 2.70 | 10.50 |

The remaining blends contained ester plasticizer or conventional processing oil, and had the following composition "B":

| Ingredient | % | PHR |
|---|---|---|
| EPDM (Vistalon 8600) | 19.28 | 100 |
| Isotactic Polypropylene | 42.22 | 219.10 |
| Fillers: | | |
| Active black (40%) | 3.72 | 19.28 |
| Clay | 7.71 | 40.00 |
| Curatives | 2.03 | 10.50 |
| Oil/Ester plasticizer | 25.05 | 130 |

The glass transition temperatures of the compositions are set forth in Table 1. The oils and plasticizers were selected using the swelling screening test described earlier.

| Blend | Oil/Ester | Rubber $T_g$ °C. | Plastic $T_g$ °C. |
|---|---|---|---|
| A | None | −41 | +10 |
| B1 | Amoco Rycon ® Grease | −47 | −1 |

-continued

| Blend | Oil/Ester | Rubber $T_g$ °C. | Plastic $T_g$ °C. |
| --- | --- | --- | --- |
| B2 | Sunpar ® 150M Paraffinic Oil | −46 | −5 |
| B3 | Parapol ® 750 Polybutene | −47 | −5 |
| B4 | Cyclolube ® 213 Naphthenic Oil | −48 | −5 |
| B5 | Cyclolube 4053 Naphthenic Oil | −50 | −5 |
| B6 | Cyclolube 410 Naphthenic Oil | −51 | −5 |
| B7 | Amoco 9012 Polypropene | −45 | −10 |
| B8 | Alkylalkylether diester glutarate (Plasthall ® 7041) | −55 | −11 |
| B9 | Diisooctyldodecanedioate (Plasthall D10DD) | −56 | −14 |
| B10 | Dioctylazelate (Plasthall DOZ) | −60 | −22 |
| B11 | Dioctylsebacate (Plasthall DOS) | −60 | −18 |
| B12 | Butoxyethyloleate (Plasthall 325) | −66 | −20 |
| B13 | n-Butyloleate (Plasthall 914) | −71 | −24 |
| B14 | n-Butyltallate (Plasthall 503) | −70 | −24 |
| B15 | Isooctyltallate (Plasthall 100) | −75 | −26 |

As is apparent from the foregoing, the inclusion of organic alkyl and alkyl ether esters in dynamically vulcanized thermoplastic elastomer substantially reduces the $T_g$ of both the rubber and plastic components, in comparison to the conventional processing oils and grease.

EXAMPLE 2

Compositions containing high molecular weight (polymeric) ester plasticizers were compared with a composition of the invention to demonstrate that the polymeric materials are not very effective in reducing $T_g$. Blends were prepared as in Example 1, using the same proportions of components as composition "B", except that the amount of ester plasticizer was 70 phr in all cases.

TABLE 2

| Blend | Ester Plasticizer | Avg. M.W. | Rubber $T_g$ °C. | Plastic $T_g$ °C. |
| --- | --- | --- | --- | --- |
| B16 | n-Butyltallate | <400 | −65 | −15 |
| B17 | Polyester adipate (Paraplex ® G-40) | 6000 | −41 | +5 |
| A | None | — | −41 | +10 |

It is apparent that the polymeric ester did not have the same effect of lowering the $T_g$ of both the rubber and plastic components of the thermoplastic elastomer, compared to monomeric esters such as n-butyltallate. This phenomenon is related to the increase in combinatorial entropy of mixing which is large for monomeric esters. This in turn results in a large and negative free energy of mixing which favors miscibility in the case of the monomeric esters but not as much for the polymeric esters. This example therefore illustrates the importance of diluent molecular weight and miscibility for maximum effect of the plasticizer.

EXAMPLE 3

Blends were prepared wherein combinations of low molecular weight ester and paraffin oil were added to a thermoplastic elastomer. Blends were prepared as in Example 1, based on composition "B" plus the indicated additives, and $T_g$ was determined.

TABLE 3

| Blend | Paraffin Oil (phr) | n-Butyl tallate (phr) | Rubber $T_g$ °C. | Plastic $T_g$ °C. |
| --- | --- | --- | --- | --- |
| A | 0 | 0 | −41 | +10 |
| B18 | 0 | 130 | −74 | −24 |
| B19 | 30 | 100 | −70 | −20 |
| B20 | 60 | 70 | −60 | −14 |
| B21 | 70 | 60 | −60 | −14 |
| B22 | 100 | 30 | −55 | −16 |
| B2 | 130 | 0 | −46 | −5 |

For a fixed amount of total diluent added (plasticizer and/or oil—130 phr in this example) the depression of $T_g$ in the thermoplastic elastomers can be controlled by combination of the ester plasticizer with appropriate amounts of rubber process oil. Mixtures of different esters together with oil may also be used.

EXAMPLE 4

The effect of addition of low molecular weight esters on the impact strength of thermoplastic elastomers was studied and compared with the effect of conventional process oil. Blends were prepared as in Example 1, using a 1300 cm$^3$ Banbury mixer, based on composition "A", plus the indicated additives (in phr). The notched Izod impact resistance at −40° C. was determined for each composition following the procedure set forth in ASTM D256-84, using specimens cut from compression molded plaques 3.17 mm in thickness.

| Blend - | A1 | A2 | A3 | A4 | A5 | A6 | A7 |
| --- | --- | --- | --- | --- | --- | --- | --- |
| Carbon black (N326) | 0 | 100 | 0 | 0 | 100 | 0 | 0 |
| Silica (Hisil 233) | 0 | 0 | 100 | 0 | 0 | 100 | 0 |
| n-Butyltallate | 0 | 0 | 0 | 130 | 130 | 130 | 0 |
| Paraffinic oil (Sunpar 150M) | 130 | 130 | 130 | 0 | 0 | 0 | 0 |
| isooctyltallate | 0 | 0 | 0 | 0 | 0 | 0 | 100 |
| Hardness (Shore D) | 38 | 38 | 36 | 37 | 37 | 36 | 35 |
| Notched Izod Impact Strength (J/m ± σ) | 82 ±48 | 76 ±35 | 93 ±52 | 414 ±48 | 489 ±40 | 424 ±32 | 427 ±47 |

It was observed that the inclusion of an alkyl monoester in place of paraffinic oil resulted in a marked improvement in toughness at −40° C., by at least a factor of 5. Such compositions are much more ductile than those prepared with hydrocarbon process oils, and have enhanced resistance to cracking at low temperatures.

EXAMPLE 5

Compositions were prepared following the procedure of Example 1, wherein the point of addition of the ester plasticizer was varied. Composition "A" was utilized, and n-butyltallate plasticizer (130 phr) was added as follows.

Composition "C"—All plasticizer was added before dynamic vulcanization of the EPDM rubber in the presence of the polypropylene.

Composition "D"—One half (65 phr) of the plasticizer was added to the formulation prior to dynamic vulcanization, and one half was added after dynamic vulcanization.

Composition "E"—All plasticizer was added after dynamic vulcanization. Both $T_g$ and physical properties were determined for the compositions, and are set forth below.

TABLE 5

|  | C | D | E |
|---|---|---|---|
| $T_g$ EPDM phase, °C. | −76 | — | −71 |
| $T_g$ Polypropylene phase, °C. | −20 | — | −25 |
| Density, gm/cm³ (ASTM D297) | 0.952 | 0.952 | 0.953 |
| Stress @ break, MPa (ASTM D412) | 13.40 | 13.24 | 11.64 |
| Strain @ break, % (ASTM D412) | 372 | 316 | 249 |
| Compression set, 22 hr/100° C., % (ASTM D395B) | 72 | — | 66 |
| Weight change, 24 hr/125° C., ASTM 3, % (ASTM D471) | 59 | — | 51 |
| ACR viscosity, poise | 1389 | 1286 | 872 |

It can be seen from the foregoing that the properties of the thermoplastic elastomer can be varied by changing the point of addition of the ester plasticizer in relation to the curing step.

EXAMPLE 6

Thermoplastic elastomers based on butyl rubber and polypropylene were prepared following the technique of Example 1, using two different ester plasticizers, a conventional rubber process oil and a blend of ester and process oil. About 90% of the diluents were added before the cure in each case. Formulations (in phr) and physical properties are set forth in Table 6.

In addition to reduced $T_g$ and improved low temperature characteristics, it should be noted that the compositions of the invention have improved (lowered) damping characteristics, as measured by Tan delta at 23° C. In contrast, the use of paraffinic oil increased the loss tangent at 23° C.

TABLE 6

| Composition | F | G | H | I | J |
|---|---|---|---|---|---|
| Butyl rubber (Polysar ® Butyl 301) | 100 | 100 | 100 | 100 | 100 |
| Polypropylene (Aristech FP200F) | 20 | 20 | 20 | 20 | 20 |
| Polypropylene (Rexene 51SO7A) | 180 | 180 | 180 | 180 | 180 |
| Isooctyltallate (Plasthall P100) | 100 | 0 | 50 | 0 | 0 |
| n-Butyltallate (Plasthall P503) | 0 | 0 | 0 | 100 | 0 |
| Paraffinic oil (Sunpar 150M) | 0 | 100 | 50 | 0 | 0 |
| Cure system[1] | 11 | 11 | 11 | 11 | 11 |
| Stearic acid | 1 | 1 | 1 | 1 | 1 |
| Active carbon black 40% | 20 | 20 | 20 | 20 | 20 |
| $T_g$ Butyl rubber phase, °C. | −76 | −52 | −57 | −75 | −56 |
| $T_g$ Polypropylene, °C. | −22 | 0 | −16 | −25 | +10 |
| Tan Delta @ 23° C. | 0.0537 | 0.0800 | 0.0581 | 0.0386 | 0.0638 |
| Hardness (Shore D)[2] | 36 | 37 | 35 | 34 | 51 |
| Stress @ break, MPa | 10.0 | 12.1 | 11.4 | 9.6 | 16.6 |
| Strain @ break, %[3] | 246 | 308 | 282 | 258 | 593 |
| Tear strength, kJ/sq m[4] | 54 | 66 | 60 | 54 | — |
| Compression set (22 hr/100° C.) | 72 | 60 | 61 | 79 | 78 |
| Weight change, % (ASTM 3, 24 hr/125° C.) | 62 | 46 | 51 | 58 | 91 |

[1]Phenolic resin (5 phr), SnCl₂ (1 phr), Zinc oxide (5 phr)
[2]ASTM D2240
[3]ASTM D412
[4]ASTM D624

EXAMPLE 7

The effect of ester concentration levels on the $T_g$ and physical properties of an EPDM rubber-polypropylene thermoplastic elastomer was studied. Composition "A" was utilized, and the technique of Example 1 was followed. The concentration of n-butyltallate in the formulation was varied from 0 to 219 phr, and the results are set forth in Table 7.

TABLE 7

| Composition | A | A8 | A9 | A10 | A11 | A12 | A13 |
|---|---|---|---|---|---|---|---|
| n-Butyltallate (phr) | 0 | 15 | 30 | 70 | 100 | 130 | 219 |
| $T_g$ Rubber phase, °C. | −41 | −50 | −55 | −65 | −70 | −74 | −75 |
| $T_g$ Polypropylene, °C. | +10 | +4.6 | −4.8 | −16 | −15 | −24 | −25 |
| Hardness (Shore D) | 58 | 50 | 49 | 42 | 38 | 37 | 27 |
| 100% Modulus, MPa | 16.2 | 16.2 | 15.0 | 11.7 | 15.5 | 11.6 | 6.5 |
| Stress @ break, MPa | 22.3 | 22.9 | 17.7 | 18.5 | 21.1 | 14.3 | 6.6 |
| Strain @ break, % | 467 | 442 | 334 | 493 | 452 | 345 | 110 |
| Weight gain, % | 61 | 58 | 55 | 55 | 47 | 45 | 27 |

TABLE 7-continued

| Composition | A | A8 | A9 | A10 | A11 | A12 | A13 |
|---|---|---|---|---|---|---|---|
| (24 hr/125° C., ASTM 3) Compression set, % (22 hr/100° C.) | — | 62 | 63 | 64 | 66 | 63 | 59 |

It can be seen that the lowering of $T_g$ is effective across most of the range of ester plasticizer added to the formulations.

EXAMPLE 8

Soft (low modulus) thermoplastic elastomer compositions containing natural rubber or EPDM rubber or oil-extended EPDM rubber were prepared following the technique described in Example 1, mixed in a 20 liter Banbury-type mixer. The effects of ester plasticizer on $T_g$, friction coefficient and physical properties were determined. The results are set forth in Table 8A. The concentrations of ingredients are expressed as phr.

TABLE 8

| Composition | K | L | M | N | O | P | Q |
|---|---|---|---|---|---|---|---|
| Oil-extended EPDM[1] | 200 | 200 | 0 | 0 | 0 | 0 | 0 |
| Natural rubber[2] | 0 | 0 | 0 | 0 | 100 | 100 | 100 |
| EPDM rubber[3] | 0 | 0 | 100 | 100 | 0 | 0 | 0 |
| Clay | 43.46 | 43.46 | 43.46 | 43.46 | 0 | 0 | 0 |
| Mineral filler | 0 | 0 | 0 | 0 | 50 | 50 | 50 |
| Zinc Oxide | 1.98 | 1.98 | 1.98 | 1.98 | 5 | 5 | 5 |
| Stearic acid | 0 | 0 | 0 | 0 | 1 | 1 | 1 |
| Polypropylene A[4] | 24 | 24 | 40 | 40 | 0 | 0 | 0 |
| Polypropylene B[5] | 7 | 7 | 7 | 7 | 0 | 0 | 0 |
| Polypropylene C[6] | 0 | 0 | 0 | 0 | 46.8 | 46.8 | 46.8 |
| Paraffinic oil[7] | 50 | 0 | 0 | 0 | 97.5 | 0 | 0 |
| Isooctyltallate | 0 | 50 | 150 | 0 | 0 | 97.5 | 0 |
| Color concentrate[8] | 3.25 | 3.25 | 3.25 | 3.25 | 3.25 | 3.25 | 3.25 |
| Curative A[9] | 4 | 4 | 4 | 4 | 0 | 0 | 0 |
| Curative B[10] | 0 | 0 | 0 | 0 | 11.7 | 11.7 | 11.7 |
| $SnCl_2$ | 1.68 | 1.68 | 1.68 | 1.68 | 0 | 0 | 0 |
| Antioxidant[11] | 0 | 0 | 0 | 0 | 1 | 1 | 1 |

[1]Epsyn P597 rubber, wxtended with 100 parts paraffin oil (Copolymer Rubber & Chemical Co.)
[2]CV60 natural rubber, Mooney 60 (Golden Hope Plantations)
[3]Vistalon ® 8600 (Exxon Chemical Co.)
[4]Rexene ® polypropylene (Rexene Corp.)
[5]Aristech FP200F (Aristech Corp.)
[6]Aristech D008M (Aristech Corp.)
[7]Sunpar 150 (Sun Chemical)
[8]Americhem 21065 R-1
[9]SP-1045 (Schenectady International Inc.)
[10]HRJ 10518 (Schenectady International Inc.)
[11]Irganox ® 1010 (General Electric Co.)

TABLE 8A

| Composition | K | L | M | N | O | P | Q |
|---|---|---|---|---|---|---|---|
| $T_g$ Rubber phase, °C. | −50 | −60 | −76 | −35 | −55 | −77 | −51 |
| Hardness (Shore A) | 54 | 53 | 53 | 85 | 67 | 64 | 85 |
| Stress @ 100% strain, MPa | 1.8 | 1.7 | 1.5 | 5.9 | 2.7 | 2.5 | 4.5 |
| Stress @ break, MPa | 4.89 | 4.17 | 1.90 | 7.33 | 4.86 | 4.50 | 4.46 |
| Strain @ break, % | 347 | 347 | 270 | 184 | 257 | 219 | 178 |
| Weight gain, % (24 hr/125° C., ASTM 3) | 87 | 109 | — | 204 | 123 | 121 | 200 |
| Friction coefficient against polypropylene | | | | | | | |
| Static | 1.80 | 1.54 | 1.07 | 1.53 | 1.00 | 1.13 | 1.40 |
| Kinetic | 1.62 | 1.66 | 1.19 | 1.55 | 1.08 | 1.33 | 1.22 |

As apparent from Example 8, the thermoplastic elastomers of the present invention have significantly reduced $T_g$ while retaining good physical properties.

While the best mode and preferred embodiment of the invention have been set forth in accord with the Patent Statutes, the scope of the invention is not limited thereto, but rather is defined by the attached claims.

What is claimed is:

1. A composition comprising (a) from about 10 to about 90 wt % thermoplastic, crystalline polyolefin homopolymer or copolymer,
   (b) from about 90 to about 10 wt % olefinic rubber, and
   (c) from about 1 to about 250 parts per hundred parts of rubber of a low molecular weight ester plasticizer which is compatible with both the polyolefin and rubber, wherein said rubber is at least partially crosslinked.

2. The composition of claim 1 wherein the polyolefin is a polymer of a $C_{2-6}$ monomer or comonomers thereof.

3. The composition of claim 1 wherein the polyolefin is selected from the group consisting of polypropylene, poly 1-butene, poly 1-pentene, poly(3-methyl 1-butene), poly(4-methyl 1-pentene) and mixtures thereof.

4. The composition of claim 1 wherein the polyolefin is polypropylene.

5. The composition of claim 1 wherein the rubber is selected from the group consisting of EPDM rubber, EPM rubber, butyl rubber, halogenated butyl rubber, copolymers of isomonoolefin and para-alkylstyrene, natural rubber, polyisoprene and mixtures thereof.

6. The composition of claim 1 wherein the rubber is EPDM terpolymer rubber.

7. The composition of claim 1 wherein the ester plasticizer has a molecular weight of about 2000 or less.

8. The composition of claim 1 wherein the plasticizer is selected from the group consisting of monomeric alkyl mono- and diesters, oligomeric alkyl mono- and diesters, monomeric alkylether mono- and diesters, and oligomeric alkylether mono- and diesters.

9. The composition of claim 1 wherein the ester plasticizer is selected from the group consisting of diisooctyldodecanedioate, dioctylsebacate, butoxyethyloleate, n-butyloleate, n-butyltallate, isooctyloleate, isooctyltallate, dialkylazelate and mixtures thereof.

10. The composition of claim 1 wherein the ester plasticizer is isooctyltallate.

11. The composition of claim 1 wherein the ester plasticizer is n-butyl tallate.

12. The composition of claim 1 which additionally includes rubber curatives, rubber processing oil, fillers, antioxidants or other additives.

13. The composition of claim 1 wherein the rubber is fully crosslinked.

14. A composition comprising
(a) from about 10 to about 90 wt % of polypropylene,
(b) from about 90 to about 10 wt % of EPDM terpolymer rubber, based on the total weight of components (a) and (b), and
(c) from about 15 to about 65 wt % of isooctyltallate, based on the total weight of components (a), (b) and (c),
wherein said rubber is at least partially crosslinked.

15. The composition of claim 14 wherein the rubber is fully crosslinked.

* * * * *